United States Patent [19]

Depp et al.

[11] 4,406,997
[45] Sep. 27, 1983

[54] METHOD AND MEANS FOR MINIMIZING THE EFFECT OF SHORT CIRCUITS IN FLAT PANEL DISPLAYS

[75] Inventors: Steven W. Depp; Anthony Juliana, Jr., both of San Jose, Calif.

[73] Assignee: International Business Machines Corporation, Armonk, N.Y.

[21] Appl. No.: 307,267

[22] Filed: Sep. 30, 1981

[51] Int. Cl.³ .............................................. G09G 3/32
[52] U.S. Cl. ................................ 340/718; 307/200 B; 365/200; 340/825.86; 340/781
[58] Field of Search ................... 307/200 B; 365/200; 340/825.86, 718, 719, 781

[56] References Cited

U.S. PATENT DOCUMENTS

| | | | |
|---|---|---|---|
| 3,631,251 | 12/1971 | Lehovic | 340/719 |
| 3,655,996 | 4/1972 | Takahashi | 307/202 |
| 3,754,171 | 8/1973 | Anzai et al. | 317/235 |
| 4,027,173 | 5/1977 | Nomiya et al. | 307/205 X |
| 4,209,713 | 6/1980 | Satou et al. | 307/200 B |

OTHER PUBLICATIONS

*Dynamically Pulsed Gate Lines to Overcome Gate Shorts in Nonvolatile Technology;* IBM Tech. Discl. Bull.; vol. 17, No. 7; 12/74; pp. 1889–1890; Leung.

"Liquid Crystal Driver Circuit and Polysilicon Components Therefor", IBM Technical Disclosure Bulletin, vol. 23, #8, Jan. 1981, pp. 3863–3864.

Primary Examiner—Marshall M. Curtis
Attorney, Agent, or Firm—Henry E. Otto, Jr.; Joseph E. Kieninger

[57] ABSTRACT

A flat panel display device comprising a matrix of X and Y drive lines and a plurality of selecting field effect transistors (FETs) is described. Each FET is selectively operable by applying a potential across a unique pair of X and Y drive lines for controlling activation of a corresponding optical transducer. A high value resistance is interposed in series between the gate electrode of each selecting FET and associated drive line to minimize the effect a short circuit caused by a defective gate electrode establishing an electrical connection between X and Y drive lines. The resistance is preferably provided by a segment of undoped polysilicon on a polysilicon circuit line connecting each gate electrode with the associated X drive line.

8 Claims, 3 Drawing Figures

METHOD AND MEANS FOR MINIMIZING THE EFFECT OF SHORT CIRCUITS IN FLAT PANEL DISPLAYS

BACKGROUND OF THE INVENTION

This invention relates to flat panel displays, and more particularly to those which are addressed a line at a time and comprise an X-Y matrix array of field effect transistors (FETs).

In displays of this type, each FET is selectively operable by applying a potential across a unique pair of X and Y drive lines. This is to control activation of a unique optical transducer disposed at a unique coordinate location and constituting a corresponding single picture element. The respective transducers may use one of a variety of types of liquid crystals or electrochromic materials as the optically active medium.

It is imperative in devices of this matrix type that no defect exist which would create a short circuit between an X and a Y drive line, because this would cause all picture elements connected to either of these lines to be rendered inoperative. The most common cause of these unacceptable short-circuit-creating defects is a pinhole in the gate oxide insulator of the FET that controls activation of the associated transducer. Such short circuits are especially critical in FET flat panel displays because they may comprise an array of as many as five million FETs.

The probability of gate insulator pinholes could be reduced by increasing the gate oxide thickness or by adding to the gate oxide an additional layer of some other insulating material, such as phosphosilicate glass. Such approaches have the disadvantage of lowering the transconductance and increasing the threshold voltage of the FETs. While this would not be a serious problem for the FETs in the X-Y matrix because of their modest performance requirements, it is a problem for the drivers, shift registers, and other devices that make up the peripheral display circuitry and which must operate with higher currents and at higher speeds. If more processing steps are added to allow the gate insulator material of these two classes of devices to be different, the complexity of fabrication is undesirably increased.

No prior art known to applicants discloses or suggests the use of high value resistors in a flat panel FET matrix-type display device to minimize the effect of drive line short circuits caused by pinholes or other defects in the oxide insulation layers of the gate electrodes of the FETs. U.S. Pat. No. 3,655,996 disclosees a resistor in the line from an input source to the gate electrode of a FET to protect that FET against excessive forward voltage by passing current between the gate electrode and the source electrode. U.S. Pat. No. 3,754,171 also teaches the use of a protective resistor in the gate circuit of a FET. U.S. Pat. Nos. 4,027,173 and 4,209,713 teach the use of a resistor in the input circuit to the gate electrode of a FET to protect that FET by serving as a current limiting means. Thus all prior art FET devices known to applicants employ a resistor in the gate circuit to protect a specific FET.

SUMMARY OF THE INVENTION

The main advantage of he invention as claimed is to provide a practical and relatively inexpensive method and means for minimizing the effect of short circuits that result from pinholes or similar defects in the gate oxide insulator of select FETs of a flat panel matrix-type display. These flat panel displays are addressed a line at a time and comprise respective sets of X and Y drive lines arranged in overlying spaced relationship to form an X-Y matrix, and also comprise a plurality of FETs, each FET selectively operable by applying a potential across a unique pair of X and Y drive lines for controlling activation of a corresponding optical transducer. Each FET includes a gate electrode connected to one of the sets of drive lines and two other electrodes operationally connected, respectively, to the other set of drive lines and to a unique optical transducer.

According to the invention, a high value resistance is interposed in series between each gate electrode and associated drive line of said one set to minimize the effect of any short circuits caused by one or more defective gate electrodes creating an electrical connection between X and Y drive lines.

BRIEF DESCRIPTION OF THE DRAWINGS

A flat panel display embodying the invention will now be described by way of example with reference to the accompanying drawing wherein.

DESCRIPTION OF PREFERRED EMBODIMENTS

Figure 1:
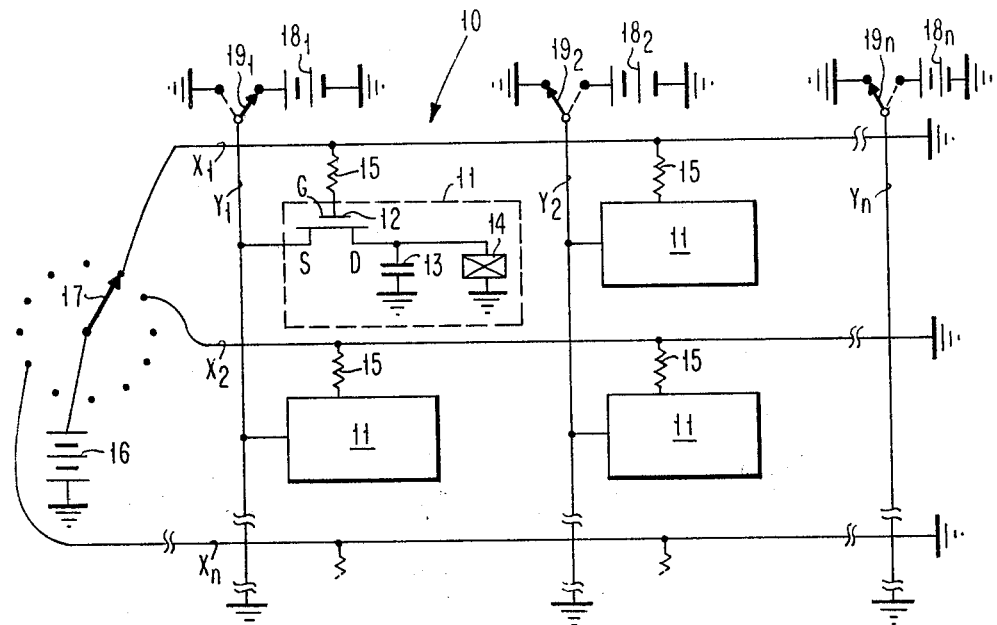
FIG. 1 is a schematic circuit diagram of one configuration of a flat panel display device embodying the invention.

In FIG. 1 there is illustrated a flat panel display device comprising a plurality of X conductors or drive lines $X_1, X_2 \ldots X_n$ and a plurality of Y conductors or drive lines $Y_1, Y_2 \ldots Y_n$ arranged in overlying spaced relationship to form an X-Y matrix 10. Adjacent each coordinate position defined by the crossovers of the respective X and Y drive lines is an assemblage 11 (only one of which is shown in detail). Each assemblage 11 comprises, as a selecting transistor, a field effect transistor (FET) 12 having a gate electrode G connected to one of the X drive lines, a source electrode S connected to one of the Y drive lines and a drain electrode D. Each drain electrode D is connected in parallel to ground by way of a capacitor 13 and an optical transducer, such as a dynamic scattering liquid crystal cell 14.

The display device as thus far described is in accordance with the teachings of the prior art In operation, assume that this display device is addressed one line at a time in raster fashion by repeatedly connecting each X drive line $X_1, X_2 \ldots X_n$ in succession to a voltage source 16, as schematically depicted by a rotary switch 176. Assume also that, concurrently therewith, one or more Y drive lines representing the data are selectively connected to a series of other voltage sources $18_1, 18_2 \ldots 18_n$ or to ground, as schematically depicted by respective switches $19_1, 19_2, \ldots 19_n$. Assume further that, while switch 17 is positioned as shown to energize drive line $X_1$, switch $19_1$, is also positioned as shown to energize drive line $Y_1$.

Under the assumed conditions, a potential will be developed at coordinate $X_1, Y_1$. As a result, the corresponding capacitor 13 will be rapidly charged and the optical active transducer medium in the liquid crystal cell 14 will be activated to provide an optical manifestation consituting a picture element at that unique coordinate position. Whern switch 17 disconnects line $X_1$ from source 16, capacitor 13 will discharge, but at a rate sufficiently slow to maintain cell 14 activated until the next refresh cycle, during which drive line $X_1$ must again be energized to keep the medium activated. Meanwhile, if switch $19_2$ is positioned as shown so that drive line $Y_2$ remains deenergized, the corresponding liquid crystal cell 14 will not be optically excited; and hence there will be no optical manifestation at the coordinate position $X_1$, $Y_2$.

Assume now that, due to a pinhole in the silicon dioxide insulator of the gate electrode G, the electrode G of FET 12 directly contacts source electrode S. This defect will short circuit drive lines $X_1$, $Y_1$, and thus prevent any optical manifestations by any of the assemblages 11 connected to either the $X_1$ or the $Y_1$ drive lines. As earlier noted, in a matrix-type display device comprising five million FETs 12, there is a probability that many such defects will exist.

According to the invention, a high value resistor 15 is interposed in series in the line connecting each gate electrode G with its associated X drive line. As a result, if X and Y drive lines become short circuited due to pinholes in the gate oxide of one or mnore FETs 12, all liquid crystal cells 14 operationally connected to those X and Y drive lines will continue to function, thereby minimizing the effect of such short circuit(s). The presence of this high value gate resistor 15 will have a negligible effect on the performance of the display because of the time available to switch the select FET 12 is relatively large in display applications (e.g., about $10^{-4}$ second). It is only necessary for the time constants of the gate resistor ($R_g$) and gate capacitance ($C_g$) to be much less than $10^{-4}$ second. For typical FETs, $C_g$ is about 0.2 picofarad; so $R_g C_g < < 10^{-4}$ second implies that $R_g$ can be as high as about 50 megohms.

Accordingly, even if many FETs 12 have pinholes inm their gate oxide insulators, their respective X and Y drive lines will not be short circuited; instead they will be connected by way of a very high resistance that will not substantially affect the individual drive line voltages. By way of example, if the source impedance of the line drive circuits is $10^4$ ohms, 500 gate oxide pinholes could exist on a single drive line before their combined effect would alter the line voltage by about 10%. This amount of protection should be more than adequate because a matrix display having $5 \times 10^6$ picture elements could be expected to have a total of about 500 gate oxide pinholes over the entire display if the probability of defective gate oxide insulators is $10^{-4}$, a typical number.

It will, of course, be understood that no special precautions need to be taken in the output circuit of each selecting FET 12. This is because any defect in the output circuit would affect only an isolated liquid crystal cell 14; and hence a substantial number of such isolated defects can be tolerated without seriously impacting operation of the display device. In this embodiment, the selecting FET 12 is assumed to be a metal gate FET.

Figure 2:
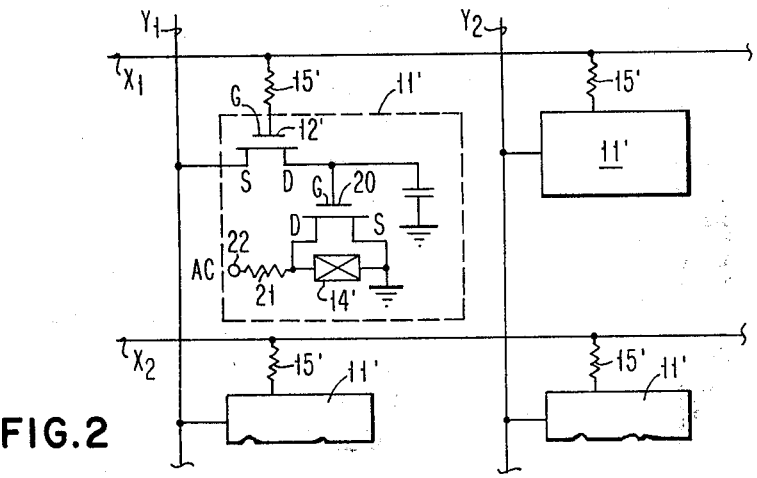
FIG. 2 is a schematic circuit diagram of another configuration of a flat panel display device embodying the invention.

In FIG. 2, like reference numerals but primed, have been used to designate components similar to those in FIG. 1. According to the variation illustrated in FIG. 2, each assemblage 11' comprises a polysilicon selecting FET 12' having its source electrode S connected to one of the Y drive lines; its gate electrode G connected via high value resistor 15' to one of the X drive lines; and its drain electrode D connected via capacitor 13' to ground and also connected to the gate electrode G of a polysilicon driving FET 20. Source electrode S of FET 20 is connected to ground and to one terminal of a twisted nematic liquid crystal cell 14'. Drain electrode D of FET 20 is connected to the other terminal of cell 14' and also to a resistor 21.

In operation, a large alternating potential is applied via a terminal 22 and resistor 21 across liquid crystal cell 14'. Driving FET 20 is held off for activating cell 14' and turned on to deactivate the cell by effectively short circuiting it. In order for the alternating potential to be high while drain electrode D of driving FET 20 is biased either positively or negatively with respect to its source electrode S, FET 20 is provided with a large threshold. Thus, in this embodiment, a relatively large alternating potential is applied across the cell 14', and the average direct potential developed across the liquid crystal is limited to a non-degrading value by, say, the use of polysilicon FETs (having a relatively high threshold) and polysilicon load resistors 21 (having relatively high intrinsic resistivity).

Figure 3:
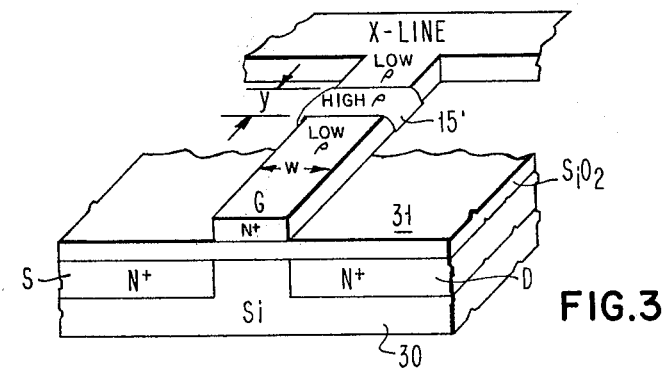
FIG. 3 is a perspective view showing how each FET gate circuit forming part of the display device of FIG. 2 preferably is fabricated.

Referring now to FIG. 3, the FET 12' may be fabricated in the conventional manner for self-aligned polysilicon gate devices. Silicon substrate 30 is oxidized to form gate oxide 31. A polysilicon layer is then deposited and delineated to form the X lines and the gate electrodes G. Prior to ion implanatation to form both the source and drain regions and dope the X lines and gate electrodes to a high conductivity, a photoresist mask 15' is applied. This mask prevents the region below from being implanated and, therefore, maintains its resistivity at a high value. By adjusting the length y of the region 15' relative to the width w, the aspect ratio y/w can be modified to provide the desired value of Rg. Hence, as y is reduced, the time constant Rg of gate resistor 15 (or 15') is reduced. It will thus be seen that the resistor 15 (or 15') may desirably be formed with only one additional processing step.

In the claims, the term "operationally connected" is intended generically to denote the direct connection of the optical transducer (liquid crystal cell 14) to the selective FET 12 as illustrated in FIG. 1 or indirect connection of cell 14' to the selecting FET 12' via the driving FET 20. It is also to be understood that the term "optical transducer" is intended generically to denote any of a number of types of liquid crystal cells, electrochromic devices or other devices which employ an optically active transducing medium.

While the invention has been shown and described with reference to preferred embodiments thereof, it will be understood by those skilled in the art that the foregoing and other changes in form and detail may be made therein without departing from the spirit, scope and teaching of the invention. Accordingly, the invention is to be limited only as specified in the claims.

We claim:
1. A flat panel display device of the line-at-a-time addressed type comprising a set of X drive lines and a set of Y drive lines arranged in overlying spaced relationship to form an X-Y matrix, and a plurality of field effect transistors (FETs), each FET selectively operable by applying a potential across a unique pair of X and Y drive lines for controlling activation of a corresponding optical transducer, each FET including a gate electrode connected to a drive line of one of the sets of drive lines, and two other electrodes operationally connected respectively to a drive line of the other set of drive lines and to a unique optical transducer, characterized in that
means providing a high value resistance is interposed in series between each gate electrode and associated drive line of said one set to minimize the effect a short circuit caused by a defective gate electrode establishing an electrical connection between X and Y drive lines.

2. A display device according to claim 1, further characterized in that the resistance providing means comprises a segment of undoped polysilicon in a polysilicon circuit line connecting each gate electrode with one of the drive lines of said one set.

3. A display device according to claim 2, wherein the magnitude of the high value resistance provided by the segment of mask material is preselected by controlling the aspect ratio.

4. A display device according to claim 1, wherein the electrode of each FET that is connected to the optical transducer is also connected in parallel to ground via a capacitor.

5. A display device according to claim 1, further characterized in that each of said FETs is a selecting FET having associated therewith a respective driving FET, the gate electrode of each driving FET being connected in parallel to one of said two other electrodes of a selecting FET and to a ground via a capacitor, and one of the other two electrodes of the driving FET being connected in parallel to ground and to one terminal of the optical transducer, the other of said other driving FET electrodes being connected in parallel to the other terminal of the optical transducer and to a source of alternating potential.

6. A flat panel display device of the line-at-a-time addressed type comprising in combination:
a set of X drive lines and a set of Y drive lines arranged in overlying spaced relationship to form an X-Y matrix;
a plurality of optical transducers;
a plurality of field effect transistors (FETs), each FET including a gate electrode connected to a drive line of one of the sets of drive lines, and two other electrodes operationally connected respectively to a drive line of the other set of drive lines and to a unique optical transducer;
means selectively operable by applying a potential across a unique pair of X and Y drive lines for controlling activation of the FETS and thereby corresponding optical transducers; and
means providing a high value resistance interposed in series between each gate electrode and associated drive line of said one set to minimize the effect a short circuit caused by a defective gate electrode establishing an electrical connection between X and Y drive lines.

7. In a flat panel display device of the type comprising a plurality of field effect transistors (FETs), each selectively operable by applying a potential across a unique pair of X and Y drive lines for controlling activation of a corresponding optical transducer and wherein each FET includes a gate electrode connected to one of the drive lines, and two other electrodes operationally connected respectively to one of the Y drive lines and to a unique optical transducer;
means for minimizing the effect of a short circuit caused by defective gate electrode establishing an electrical connection between X and Y drive lines, said means comprising a high value resistance interposed in series between each gate electrode and associated drive line.

8. A display device according to claim 7, further characterized in that the resistance is provided by intentionally leaving a segment of undoped polysilicon in a polysilicon circuit line connecting each gate electrode with its associated X drive line.

* * * * *